(12) United States Patent
Nouais et al.

(10) Patent No.: US 10,376,008 B2
(45) Date of Patent: Aug. 13, 2019

(54) COMPUTER-IMPLEMENTED METHOD FOR DESIGNING A GARMENT OR UPHOLSTERY BY DEFINING SEQUENCES OF ASSEMBLY TASKS

(71) Applicant: Dassault Systemes, Velizy Villacoublay (FR)

(72) Inventors: Denis Nouais, Clamart (FR); Auxkin Ortuzar Del Castillo, Saint-Cloud (FR); Cyril Ngo Ngoc, Asnieres-sur-Seine (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 211 days.

(21) Appl. No.: 15/631,840

(22) Filed: Jun. 23, 2017

(65) Prior Publication Data
US 2018/0020756 A1    Jan. 25, 2018

(30) Foreign Application Priority Data

Jul. 20, 2016    (EP) .................................... 16305931

(51) Int. Cl.
*A41H 3/00* (2006.01)
*G06F 17/50* (2006.01)
(Continued)

(52) U.S. Cl.
CPC ......... *A41H 3/007* (2013.01); *G06F 17/5009* (2013.01); *G06F 17/5018* (2013.01);
(Continued)

(58) Field of Classification Search
CPC . A41H 3/007; G06F 17/5009; G06F 17/5018; G06F 2217/32; G06T 2210/16
(Continued)

(56) References Cited

U.S. PATENT DOCUMENTS

| 2,374,440 A | * | 4/1945 | La France | ................ | A41B 1/00 |
| | | | | | 2/115 |
| 2002/0138170 A1 | * | 9/2002 | Onyshkevych | ........ | G06Q 30/06 |
| | | | | | 700/130 |

(Continued)

FOREIGN PATENT DOCUMENTS

| EP | 2458 561 A2 | 5/2012 |
| FR | 2894 783 A1 | 6/2007 |

OTHER PUBLICATIONS

X. Provot. "Animation réaliste de vêtements" PhD Thesis. Université René Descartes—Paris V, 1997 (Chapter 3, pp. 115-140).

(Continued)

*Primary Examiner* — Nathan E Durham
(74) *Attorney, Agent, or Firm* — Hamilton, Brook, Smith & Reynolds, P.C.

(57) ABSTRACT

A computer-implemented method for designing a virtual garment or upholstery in a three-dimensional scene comprising the steps of: a) providing a three-dimensional manikin, a set of pattern parts of said virtual garment or upholstery and a set of seam specification; b) receiving from a user a plurality of declarations of assembly tasks (A, B, C, D1, D2, E1, E21, E22, F2) for assembling the garment or upholstery; c) receiving from the user at least a declaration of a partial ordering relationship between two or more of said assembly tasks; d) executing said tasks according to said partial ordering relationship, each task changing a state of the garment or upholstery under assembly; characterized in that it further comprises a step of: e) while executing the tasks, generating a tree data structure comprising nodes linked by directed arcs, each node being associated to a state of the garment or upholstery and each arc being associated to an assembly task. A computer program product, non-volatile computer-readable data-storage medium and Com- (Continued)

puter Aided Design system for carrying out such a method. Application of the method to the manufacturing of a garment or upholstery.

16 Claims, 17 Drawing Sheets

(51) Int. Cl.
*G06T 17/20* (2006.01)
*G06T 19/00* (2011.01)

(52) U.S. Cl.
CPC ............ *G06T 17/20* (2013.01); *G06T 19/006* (2013.01); *G06F 2217/32* (2013.01); *G06F 2217/41* (2013.01); *G06T 2210/16* (2013.01)

(58) Field of Classification Search
USPC .................................................. 700/130–132
See application file for complete search history.

(56) References Cited

U.S. PATENT DOCUMENTS

| | | | | |
|---|---|---|---|---|
| 2002/0188372 | A1* | 12/2002 | Lane | G06T 19/00 700/130 |
| 2009/0099683 | A1* | 4/2009 | Lastra | A41H 3/007 700/132 |
| 2009/0222127 | A1* | 9/2009 | Lind | A41H 3/007 700/132 |
| 2014/0277683 | A1* | 9/2014 | Gupta | G06F 17/50 700/132 |
| 2015/0130795 | A1* | 5/2015 | Chhugani | G06T 19/20 345/419 |

OTHER PUBLICATIONS

Extended European Search Report from European Application No. 16305931.4, entitled: "Computer-Implemented Method for Designing a Garment or Upholstery by Defining Sequences of Assembly Tasks," dated Jan. 23, 2017.

Clo Virtual Fashion Inc.: "CL03D Enterprise Manual," 2015, pp. 1-5. Retrieved from the Internet on Jan. 9, 2017: URL:http://manual.clo3d.com/display/CL03DM/CLO+Enterprise+Manual.

Relange, et al.: "Systematic determination of assembly state transition diagrams," Assembly and Task Planning, 2001, Proceedings of the IEEE International Symposium on May 28-29, 2001, Piscataway, NJ, USA, May 28, 2001, pp. 55-60, ISBN: 978-0-7803-7004-3.

Marzia Fontana, Caterina Rizzi, Umberto Cugini "3D virtual apparel design for industrial applications," Computer-Aided Design 37 (2005), pp. 609-622.

Michael Keckeisen "Physical Cloth Simulation and Applications for the Visualization, Virtual Try-On, and Interactive Design of Garments," PhD Thesis, Tübingen University, 2005.

A. Fuhrmann, C. Groβ, A. Weber. Ontologies for Virtual Garments, Workshop Towards Semantic Virtual Environments (SVE 2005), 2005.

CLO 3D/Marvelous Designer Manual. 2013.

* cited by examiner

COMPUTER-IMPLEMENTED METHOD FOR DESIGNING A GARMENT OR UPHOLSTERY BY DEFINING SEQUENCES OF ASSEMBLY TASKS

RELATED APPLICATION(S)

This application claims priority under 35 U.S.C. § 119 or 365 to Europe, Application No. 16305931.4, filed Jul. 20, 2016. The entire teachings of the above application(s) are incorporated herein by reference.

FIELD OF INVENTION

The invention relates to the field of computer-aided design. More particularly, it concerns a computer-implemented method for designing a virtual garment or furniture upholstery comprising one or more two-dimensional (2D) pattern parts. Even more particularly, it aims at easing the definition of suitable sequences of assembly tasks of a virtual garment or furniture, for instance by allowing partial reuse of similar designs.

The invention also concerns a computer-aided design system, a computer program product and a non-volatile computer-readable data-storage medium containing computer-executable instructions to cause a computer system to carry out such a method, as well as a method of manufacturing a real garment or upholstery.

The invention applies to the clothing industry for the design of real garments and to the furniture industry for the design of real upholstery, but also to video games, animated movies etc. In general any domain where it's necessary to design realistic clothing on a computer in three dimensions (3D), be it for integration to a virtual world or for manufacture.

BACKGROUND

In the following, the word "manikin" will be used broadly to designate a computer-generated, usually three-dimensional, representation of a human or animal body, a humanoid or zoomorphic creature, or even a vegetable or an inanimate object (e.g. a piece of furniture such as a sofa). Most often, however, the manikin will be a representation of a human or humanoid body. The manikin may be designed ab initio, or it may be reconstructed by scanning a real body or object. A manikin may also be called an "avatar".

The words "virtual garment" or "virtual upholstery" will refer to a computer-generated bi-dimensional or (most often) three-dimensional representation of clothing, upholstery or the like, suitable to be worn by a manikin. The virtual garment may be a model of a "real" garment suitable to be manufactured in the physical world. In the following, only the case of garments will be discussed, but all equally applies to upholstery.

Manikins and virtual garments are preferably "three-dimensional" (3D). Hereafter, a "three-dimensional" object will be an object—or a digital model thereof—admitting a three-dimensional representation, which allows the viewing of its parts from all angles.

The word "pattern part", or simply "pattern", will designate a piece of fabric, leather or other flexible material suitable to be used to manufacture a garment. A garment is most often manufactured by assembling several pattern parts by their edges. Patterns are usually considered two-dimensional, as they are developable (they can lie flat on a plane) and their thickness is negligible (smaller by at least two orders of magnitude) over their other dimensions.

A "seam" is a connection between two edges of a same or of two different pattern parts, which are stitched together in order to assemble the garment. "Stitching" should be construed broadly, encompassing all assembly techniques suitable for flexible materials such as fabric or leather, including sewing but also e.g. gluing.

Computer-aided techniques have been widely used in the development process of pattern-making in the fashion industry. Specifically, CAD (Computer Aided Design) and CAM (Computer Aided Manufacturing) systems have helped to produce digital 2D pattern parts which are then used to manufacture garments. These pattern parts are generally described as two-dimensional boundary curves enriched with additional information needed to physically construct the final garment. Several CAD systems exist on the market from companies such as Lectra, Gerber Technology, Optitex, Assyst GmBH (Human Solutions Group), Clo3D (Marvelous Designer). The modules they propose present common characteristics and are mainly focused on 2D pattern parts development, CAD-CAM management and manufacturing (e.g. pattern layout and cut with automatic machine).

With the emergence of 3D, virtual clothing is becoming a standard and it requires new techniques to assemble virtually the 2D pattern parts in order to get the virtual garment. However, while a number of publications teach how to design and simulate garments by computer, very few of them address the assembly process, where several pattern parts are stitched together to form a garment.

Document [Pro97] describes the assembly of a garment around a 3D manikin from several flat pattern parts. The assembly process consists of four steps:

1. Positioning of the pattern parts around the manikin,
2. Convergence of the edges of the pattern parts to be stitched together,
3. Merging of the pattern parts whose edges are stitched together,
4. Computation of the draping, taking into account the manikin.

The document explains that the order in which the pattern parts are stitched together is important and affects the final result. This order has to be found by trials and errors, and the user needs taking note of it if he wants to repeat the assembly.

Document [Kec05] describes a method for designing and simulating garments comprising pre-positioning planar pattern parts around a manikin and then sewing the pre-positioned pattern parts together, which involves merging them along seam lines. The sewing step, wherein all the seams are handled simultaneously, may only begin after all the pattern parts have been pre-positioned, which is quite restrictive.

Similarly, [Fon05] does not take into account the order of the different assembly tasks.

[Fuh05] discloses an ontology for garment pattern parts that enables declaring the pattern parts that are sewn together, as well as the order in which a virtual dressing of a collection of garments is performed. However, no detail is provided on the positioning and stitching of the pattern parts forming each garment; it seems that all the seams are assembled simultaneously.

Most commercial software tools for garment design follow the same approach, i.e. all the seams are assembled simultaneously. See for instance Physan DC Suite, Optitex, V-Stitcher from Browzwear, Vidya from HumanSolutions Gmbh.

The commercial software CLO3D/MarvelousDesigner enables to deal with seams and patterns in a sequential way. Indeed, in this software:
  seams can be activated or deactivated by the user,
  pattern parts can be activated/deactivated/frozen,
  new pattern parts and seams can be introduced by the user.

Using the activation/deactivation commands, the user can avoid dealing simultaneously with all the patterns and the seams. A "freeze pattern" allows "freezing" a pattern part, i.e. fixing its position while allowing other pattern parts to interact with it to avoid interpenetration of the parts. This tool may be useful to simplify the draping of multi-layered garments, by freezing an inner garment and draping over it. According to Clo3D user manual [CLO3D], this step by step draping process prevents that the simulation of the draping of multiple layered garments become unstable.

This approach allows creating complicated virtual 3D garments, but lacks repeatability. If two users try to design a same garment, using the same pattern parts and seam definitions, the will usually achieve different results as they will not necessarily perform exactly the same assembly task in the same order.

Furthermore, an assembly process cannot be easily adapted to other garments. For instance, the sequence of assembly tasks used for a sleeveless dress cannot be easily adapted to the creation of a similar new dress with sleeves.

Finally, is not clear how to replace or modify some patterns with another one during the process.

Moreover the approaches known from the prior art lack flexibility, the user having no control on the parameter used by the CAD system to carry it out. Such parameters include, for instance:
  The gravity strength. Indeed, depending on the configuration, the gravity can help or hinder the assembly. For example, 1G (i.e. normal) gravity induces a free fall of pattern parts of 20 cm in 0.2 which, for instance, may compromise the assembly of the front and back panels of a shirt. Therefore it would be advisable to switch the gravity off, or at least reducing its strength during certain assembly steps. On the contrary, gravity may make a flat sleeve pattern part fold on the arm of a manikin in T-pose, easing its assembly.
  Assembly speed, which allows taking into account the strongly variable difficulty of assembling seams depending on their configuration.

SUMMARY

The invention aims at overcoming the drawbacks of the prior art, allowing to assemble virtual garments or upholstery in a flexible, effective and repeatable way.

An object of the invention, allowing achieving this aim, is a computer-implemented method for designing a virtual garment or upholstery in a three-dimensional scene comprising the steps of:
  a) providing a three-dimensional manikin in the three-dimensional scene, a set of pattern parts of said virtual garment or upholstery and a set of seam specification, a seam including a set of distance constraints between pairs of points of two pattern part edges to be stitched together;
  b) receiving from a user a plurality of declarations of assembly tasks for assembling the garment or upholstery;
  c) receiving from the user at least a declaration of a partial ordering relationship between two or more of said assembly tasks;
  d) executing said tasks according to said partial ordering relationship, each task changing a state of the garment or upholstery under assembly;
characterized in that it further comprises a step of:
  e) while executing the tasks, generating a tree data structure comprising nodes linked by directed arcs, each node being associated to a state of the garment or upholstery and each arc being associated to an assembly task, the task of an arc connecting a first node to a second node changing the state associated to the first node to the state associated to the second node.

According to particular embodiments of the inventive method:
  Step d) may comprise performing a physics-based simulation of the assembly of the garment or upholstery.
  At least one task may comprise at least one statement chosen among: adding a pattern part and positioning it around the manikin, or removing a pattern part already positioned around the manikin; activating or freezing a pattern part, wherein an activated pattern part is fully simulated while, during simulation, a frozen pattern part remains immobile but is suitable to interact with other parts; adding or removing a seam specification; activating or freezing a seam wherein, during simulation, the distance constraints of a frozen seam remain unchanged while those of an activated seam are progressively decreased until a threshold is reached and the points are merged; changing a level of simulation detail of a pattern part; and introducing or removing geometrical constraints on a pattern part.
  At least one task may comprise setting at least one simulation parameter chosen among: gravity strength; assembly speed; threshold for merging of two points of a seam; type of synchronization of the decrease of the distance constraints of an activated seam.
  Step b) may further comprise receiving from a user at least one instruction for modifying a design of a pattern part, or a pattern part positioning around the manikin.
  Steps b) and c) may be carried out interactively.
  The method may further comprise a step of performing a consistency check wherein pattern parts or seams not involved in any assembly task or having a status incompatible with an assembly task are identified.
  The method may further comprise a step of cleaning up the assembly tasks, wherein: when a pattern part is removed from the garment, the pattern part and any seam referencing it are removed from all the tasks; and/or when a pattern part is removed from a task, the pattern part and all seams referencing it are removed from all the following tasks.
  The method may further comprise a step of generating a direct acyclic oriented graph data structure comprising nodes linked by directed arcs, each node being associated to a task of the list and arcs representing an ordering of said tasks. Such a method may further comprise a step of selecting a tree within said direct acyclic oriented graph data structure and carrying out the tasks associated with the nodes of the tree in an order defined by its arcs.

Another object of the invention is a computer program product, stored on a non-volatile computer-readable data-storage medium, comprising computer-executable instructions to cause a computer system to carry out such a method.

Another object of the invention is a non-volatile computer-readable data-storage medium containing computer-executable instructions to cause a computer system to carry out such a method.

Another object of the invention is a Computer Aided Design system comprising a processor coupled to a memory and a graphical user interface, the memory storing computer-executable instructions to cause the Computer Aided Design system to carry out such a method.

Another object of the invention is a method of manufacturing a garment or upholstery comprising:
- a step of designing said garment or upholstery by a method as outlined above; and
- a step of physically manufacturing said garment or upholstery by carrying out physical assembly tasks corresponding to tasks associated to a set of nodes of the tree data structure, in a same order.

Yet another object of the invention is a garment or upholstery obtained by this method of manufacturing.

The invention has several major advantages over prior art:
- It improves the performances of the garment simulation. Indeed, as the seams are not all created at the same time, fewer pattern parts must be merged simultaneously, reducing the computational burden, and therefore the simulation time, and improving the stability of the simulation.
- It simplifies the management of layers of garments. For instance, is possible to assemble garments that are closest to the manikin first and freeze them before considering the other ones.
- It simplifies the assembly of sleeves, as it is not necessary required that the user defines a geometrical constraint (the use of such a constraint is optional, as it will be discussed later).
- Pattern parts may be easily replaced during the assembly, allowing testing different configurations of a garment (e.g. shirts with long/short sleeves, with/without pocket . . . ).
- Already-defined task sequences may be partially reused for assembling similar garments.
- It allows repeatability of the assembly process.
- It allows the user to control the parameters used during the assembly phase (settings including gravity activation or not, assembly speed, start or stop synchronization, etc.).

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

Additional features and advantages of the present invention will become apparent from the subsequent description, taken in conjunction with the accompanying drawings, which show.

DETAILED DESCRIPTION

A description of example embodiments follows.

Figure 1A:
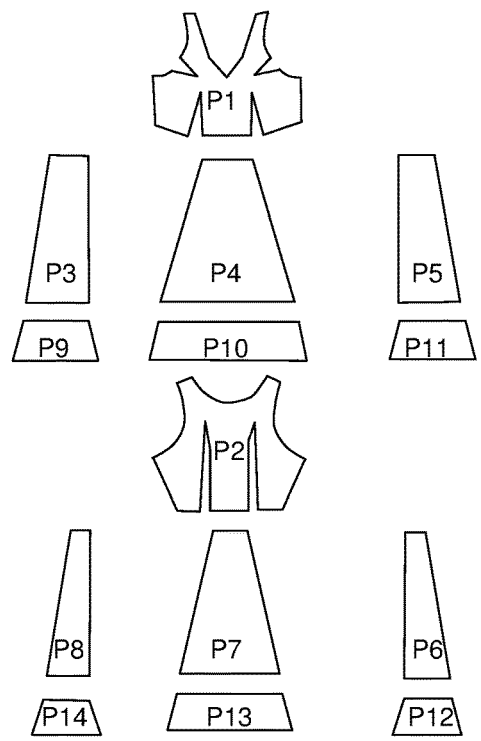
FIGS. 1A and 1B, respectively, a set of pattern parts of a virtual garment and some seam specifications of said garment.
Figure 1B:
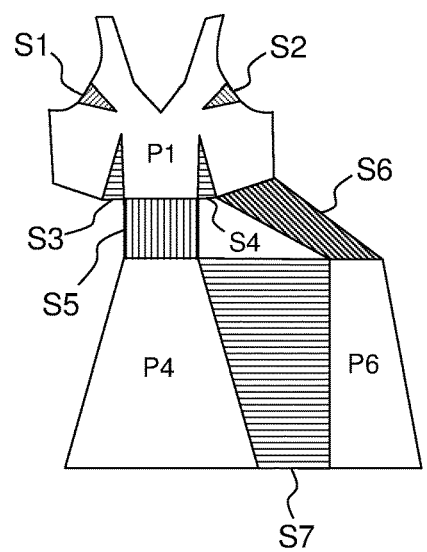

FIG. 1A shows an example of pattern design for a dress made of 14 pattern parts P1-P14, assembled using 34 seams. FIG. 1B represents some of these seams: S1-S7. It will be noted that seams S1-S4 are "internal", i.e. they connect edges of a same pattern part (the front panel of the bodice P1), while seams S5-S7 are "external", i.e. they connect edges of different pattern parts. A seam is constituted by segments connecting matching points of two edges, imposing a distance constraint between these points. A seam is assembled by progressively reducing the length of the segments, thus bringing the matching points of the edges closer to each other, then by merging these points when their distance become smaller than a threshold. A mesh is usually defined on the pattern parts to allow simulating their physical behavior, e.g. by a finite elements methods; when the matching points are merged, the meshes on both sides of the seam are also merged. Documents [Kec05], [Fon05] and [Fuh05] describe in detail different method of performing seam assembly.

According to the invention, in order to design and simulate a garment on a computer system, a user has to define a manikin, a set of pattern parts and the seams necessary for assembling the garment. The manikin and the pattern parts may be imported from respective databases and situated in a virtual 3D scene, the pattern parts being pre-positioned around the manikin e.g. by dragging and dropping them. Alternatively, pattern parts may be designed (usually in 2D, but possibly also directly in the 3D scene) using a suitable CAD tool. The seams may be defined by simply identifying the relevant edges, the matching points being vertices of the pattern part meshes lying on said edges.

The user also has to define a sequence of assembly tasks. An assembly task comprises at least one of the following items of information:
- A statement declaring garment pattern parts and/or seams, or indicating an action performed on the declared pattern parts or seams;
- One or more settings—i.e. the values of one or more parameters of the assembly and simulation process.

When a seam is declared, length constraints between point pairs of pattern part boundaries to be joined are created. The constraint lengths are initialized to the current distances.

Both pattern parts and seams have a status, which is set at an initial value when these elements are declared and may be subsequently modified by a statement. According to a preferred embodiment, pattern parts and seams may be declared in one of two states: "active" or "frozen".

An active pattern part is simulated during the task execution, while a frozen part is present during the task execution but does not move (it remains in its initial, or previously simulated, position).

In an active seam, the lengths of the constraint are progressively decreased, until the matching points are merged, while in a frozen seam the length constraints are unchanged (this, in particular, avoids that the edges of a frozen seam are pull apart).

An active seam may connect two edges of a same active pattern part, of two active parts or of an active part and a frozen one. However, a seam defined between two frozen pattern parts is ignored. When a seam is already completed (its edges are merged), it does not evolve anymore, and all statements concerning it are ignored.

According to a preferred embodiment, a task declaration may include zero, one or more statements chosen among the following:

- Adding a pattern part and positioning it in the 3D virtual scene around the manikin. By default, the initial status of a newly-added pattern part is "active".
- Removing a pattern part already positioned around the manikin.
- Adding a seam specification. By default, the status of a newly-added seam is "active".
- Changing the status of a pattern part or seam from "active" to "frozen", or vice-versa.
- Changing the level of detail of a pattern part. As explained above, a mesh is defined on each pattern part to allow simulating its physical behavior. The finer the mesh, the more accurate is the simulation, but more intensive (and slow) are the calculations. The "optimal" finesse of a mesh varies depending on the particular step of the design and simulation process: a comparatively rough mesh may be sufficient for assembly, while a finer one will be preferred for simulating the draping of the assembled garment.
- Defining constraints. Indeed, in addition to the possibility of freezing whole garment pattern parts, 1, 2 or 3-degree of freedom (d.o.f) reductions can be applied to a vertex of the mesh of a pattern part. A 1-d.o.f. reduction makes the vertex move in a plane defined by its current position and a normal direction provided by the user; a 2 d.o.f. reduction makes the vertex move on a line defined by its current position and a direction, a 3 d.o.f. reduction makes the vertex fixed. A d.o.f. reduction may, for instance, avoid that a sleeve slips from the manikin's arm under the effect of gravity before being stitched.

According to a preferred embodiment, a task declaration may also include the setting of zero, one or more parameters chosen among:

- Gravity strength. As explained above, during some stitching phases it may be desirable to reduce, or even switch off—the gravity. On the contrary, gravity may be required for other stitching phases (e.g. for stitching sleeves) and, of course, for draping.
- Assembly speed. The seam assembly should be performed as fast as possible but may be limited to ensure the convergence of the assembly simulation. The density of vertices along the seam curves and the number amount of wrinkles generated by the seam are factors requiring limited assembly speed. Thus, this parameter is defined independently for each task.
- Merge threshold, i.e. the distance between matching point of an active seam under which the points are merged.
- Synchronization. Before the beginning of a stitching phase, the segments connecting pairs matching points of a seam have different length. There are several options offered to the user to progressively decrease the length of the segments:

1. Start decreasing all segment lengths at the same time with constant length reduction rates. The shortest segments are ready to merge before the longest ones.
 2. Decrease the length of all the segments at a same, constant rate, but starting from the longest ones, so that all matching point pairs are merged simultaneously.
 3. Start decreasing the lengths of all the segments simultaneously, but using different length reduction rates so that all the pairs of matching point are merged simultaneously.

Figure 3:
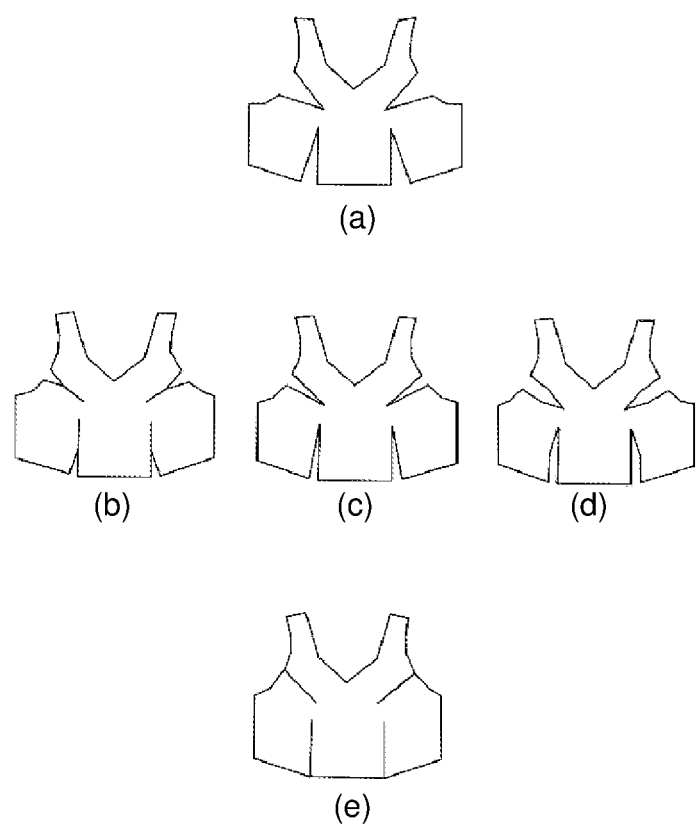
FIG. 3, an illustration of three different types of synchronization of a seam assembly.

On FIG. 3, image (a) represents the initial condition of pattern part P1, image (e) the final condition when internal seams S1, S2, S3 and S4 have been stitched, and images (b), (c) and (d) intermediate conditions corresponding to the first, second and third type of synchronization described above.

Figure 2:
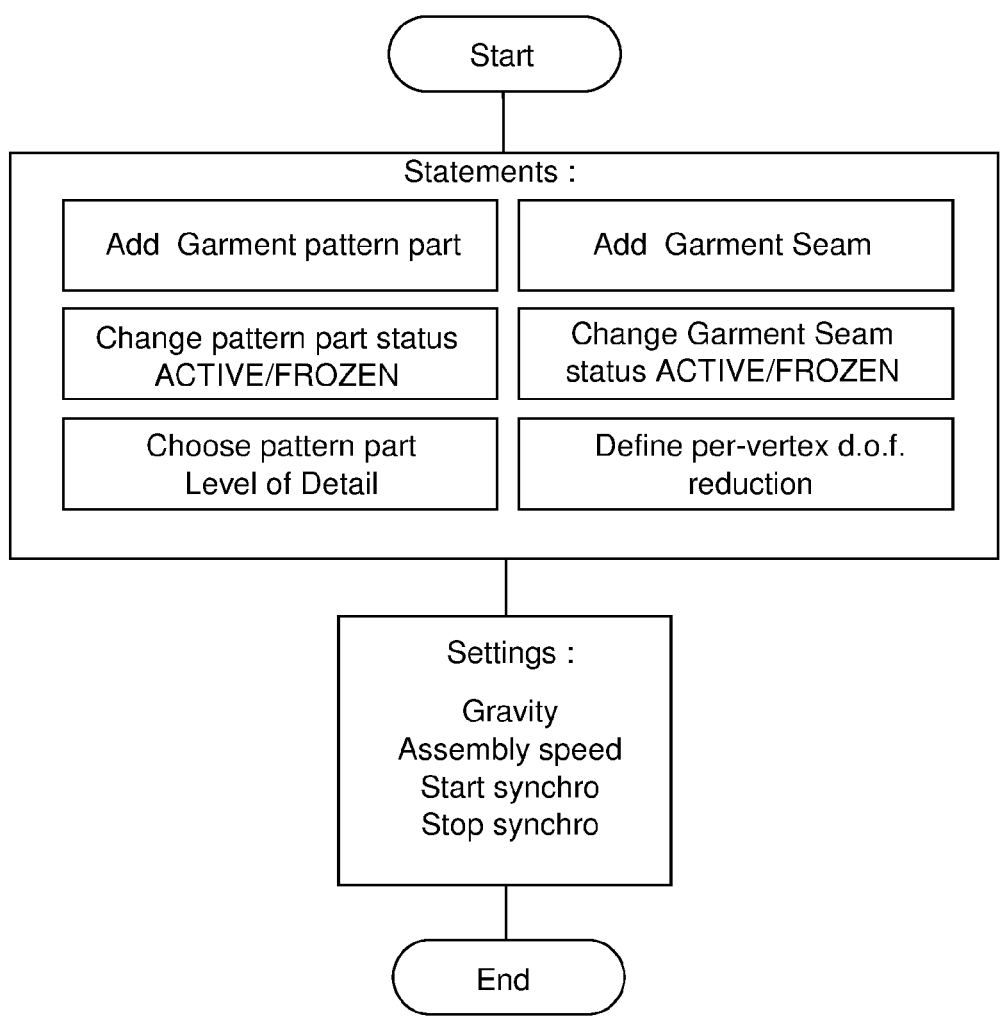
FIG. 2, a schematic representation of a task declaration step.

FIG. 2 summarizes the structure of an assembly task.

The user also declares parent-child relationships between tasks. Such a relationship defines a partial ordering of the task—partial because a "parent" may have one or more "children", and a "child" may have one or more "parents". The tasks and their parent-child relationships define an assembly process, or even a set of assembly processes sharing a number of tasks. It is advantageous to represent this process or set of processes by a graph data structure, more precisely, a direct acyclic oriented graph whose nodes represent individual tasks and whose arcs represent parent-child relationships between tasks. Each task may have more than one connection as parent to create bifurcations in the graph, or more than one connection as child to create joins. A particular assembly process, for a single variant of the garment model, is represented by a single branch of the graph.

Figure 4:
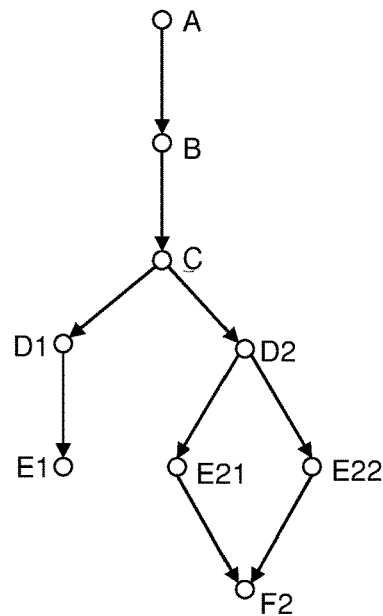
FIG. 4, an exemplary task graph.

FIG. 4 illustrates such a graph. On the figure, nodes A, B and C correspond to tasks common to all the assembly processes; node A constitutes the single entry point, but in different examples multiple entry points may be present. After the task associated to node C, the user has a choice; he may perform the tasks associated to nodes D1 and E1 (in this order); or he may perform the tasks associated to node D2, after which he is faced with a second choice. Indeed, after task D2, he may perform the task associated to either node E21 or node E22. In both cases, the final task of the assembly process is represented by node F2 (which constitutes a "join"). In other words, the graph of FIG. 4 represents three possible sequences of assembly tasks:

A, B, C, D1, E1;
A, B, C, D2, E21, F2;
A, B, C, D2, E22, F2;

which will lead to three different garments.

According to different embodiments of the invention, the graph of FIG. 4 may be considered an abstract representation of the assembly process or, preferably, correspond to a data structure stored in a memory device of the computer system. In the latter case, the data structure ensure the repeatability of the assembly processes, as it contains the definition of all the tasks (the nodes) and the order relationship between them (the arcs). Therefore, the assembly may be performed several times leading to identical results; if some changes are introduced e.g. in the design of some patterns, it will be ensured that the differences in the final results will only depend on these changes and not, e.g. on an unintentional alteration of the order of the assembly tasks.

At each time of the assembly and simulation process, the garment under assembly is characterized by a state, constituted by all the information required to restart the process.

In other words, if the process is interrupted but the current state of the garment is saved, it will be possible to restart the process from the point at which it was interrupted, and achieve the same result as if the interruption had not occurred. Typically, the state includes the following items of information:
- a list of the used pattern parts,
- a list of used seams with their status,
- the position and velocity of each vertex of the meshes of the pattern parts, and
- the topology of the garment model used by the simulation depending on the level of detail of the pattern parts meshes, and the seam status.

Figure 5:
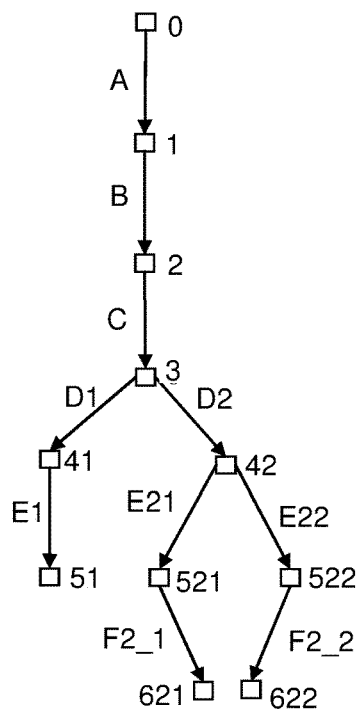
FIG. 5, an exemplary state tree associated to the task graph of FIG. 4.

The topology of the garment model is defined by the edges linking the vertices of the meshes of the garment, obtained by merging the meshes of individual pattern parts. An assembly task applied to a garment in a given state leaves it in a new state. These states can be organized in a graph—more precisely, a directed tree—data structure whose structure is consistent but different from the task graph. FIG. 5 shows the state tree associated with the task graph of FIG. 4.

The nodes of the state trees represent the states and are labeled by 0, 1, 2, 3, 41, 42, 51, 521, 522, 621 and 622 on the figure; the root node, labeled '0' is empty (before the first task, the state contains no pattern parts and no seams); the leaves (51, 621, 622) correspond to completely assembled garments. The edges of the tree correspond to the assembly tasks A, B, C, D1, D2, E1, E21, E22, F2 described above. A state tree corresponding to a task graph made of N possible entry tasks (i.e. N independent initial tasks) has N branches starting from the root node; this case is not represented on the figures. Bifurcations in the task graph result in bifurcations in the state tree, but joins in the task graph leave independent state tree branches. Indeed, a same task applied on different initial states results in different final states. For instance, in the example considered here, task F1 is applicable to state 521 and state 522 leading respectively to states 621 and 622. It will be noted that edges F2_1 and F2_2 correspond to a same task, F2, applied to different states —521 and 522, respectively.

State tree are useful not only to resume an interrupted assembly process, but also to speed-up the design and simulation of multiple variations of a garment. For instance, once the garment corresponding to leave 51 has been designed, it is possible to assemble another garment, corresponding to leave 621, starting from state 3. And then, garment corresponding to leave 622 can be assembled starting from state 42. Overall, the assembly of the three garments requires the execution of 10 task, while 17 tasks would be required if states were not saved.

The task graph alone is sufficient for defining the structure of the state tree but, in order to determine the content of the nodes—i.e. the garment states—it is necessary to execute the assembly tasks. If a user wants to fill the state tree methodically, he may perform a depth-first parsing of the state tree. Task A will be executed first—taking the empty state as the initial condition—then B, C, D1, E1; at this point, the parsing algorithm will backtrack to state 3, and tasks D2, E21, F2 will be performed. The algorithm will then backtrack to state 42, and perform tasks E22 and F2 (same task as above, but starting from a different state). The final state of each task will be stored in the corresponding node of the tree. Therefore, while the task graph may be constructed before the beginning of the assembly of the virtual garment, the state tree is constructed during the assembly process.

Figure 7:
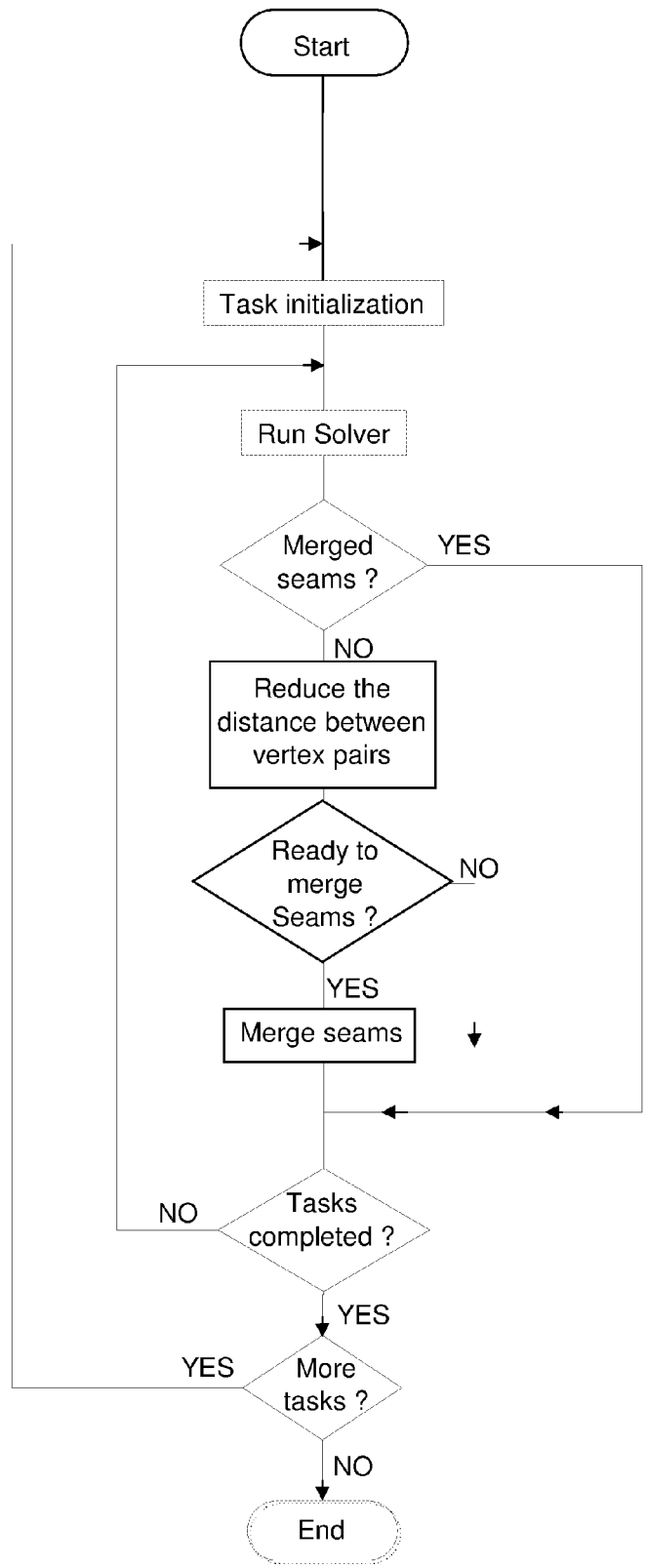
FIG. 7, a flow-chart of an assembly process according to an embodiment of the invention.

The execution of a generic task is illustrated on the flow-chart of FIG. 7. It begins with an initialization step wherein discrete cloth model structures, including meshes, are created according to the required level of detail of each involved garment pattern parts and seams. The positions of the vertex of the meshes are then interpolated from an initial state if the garment pattern part was already present, or from the 3D positioned pattern part if not.

Then, a solver runs one simulation step. If the task contains active seams which are not merged yet, the stitching segment lengths are reduced according to the task settings. Is all stitching segments are under the length threshold, then the corresponding matching points are merged, implying re-computing the simulated cloth structure. After that, if the task sequence has not been exhausted, the execution of the following task begins.

Figure 6:
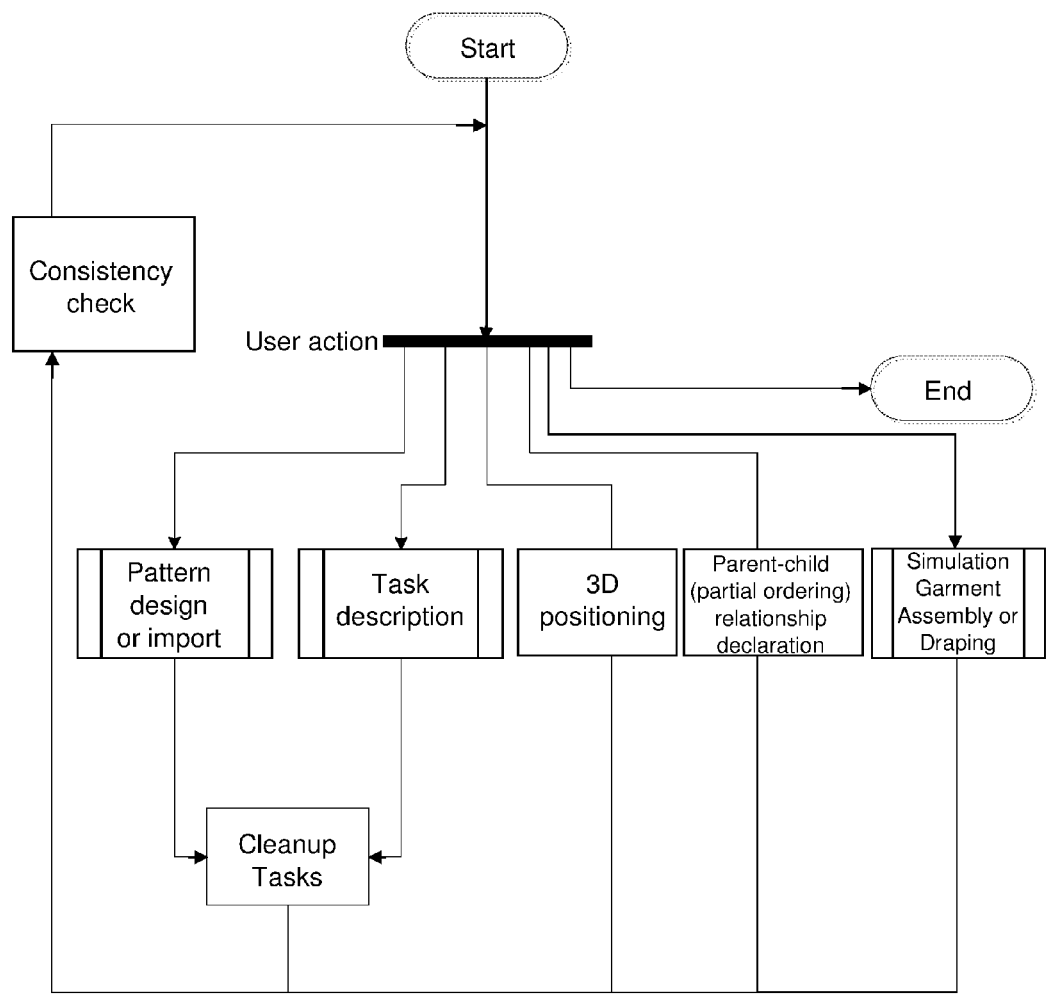
FIG. 6, a flow-chart of a garment design and assembly workflow according to an embodiment of the invention.

FIG. 6 is a global representation of an interactive method for assembling and simulating garments according to the invention. The method is carried out iteratively; at each iteration the user may choose among different actions. He may:
- Design or modify, using a suitable CAD tool, one or more pattern parts, or importing them from a file;
- Position one or more pattern parts around an avatar, e.g. by dragging and dropping them using a mouse or a similar input device; the position of the pattern parts is an item of information belonging to the "state" of the garment which is recorded in each node of the state tree;
- Declare a task;
- Declare a parent-child (i.e. partial ordering) relationship between tasks;
- Simulate the assembly and/or the draping of a garment by executing a sequence of tasks, as described above in reference to FIG. 7;
- End the process.

After the design or import of a pattern part, or the description of a task, a clean-up of the tasks may be performed. The clean-up consists in parsing the task tree to adapt it to the changes to the garment design: if a seam has been removed from the design, it is also removed from all assembly tasks; if a garment pattern part has been removed from the design, this pattern part and every seam referencing it are removed from all tasks; if a pattern part has been removed from a task, the seams referencing this pattern part are removed from downstream tasks.

A consistency check may be performed between two user actions. It comprises parsing the task tree to identify, and communicate to the user, unused pattern parts and seams, constraints which remain at the end of the process and impossible/incoherent tasks, e.g. trying to assemble seams between frozen pattern parts. The user may then correct the inconsistencies—of not (for instance, the presence of an unused pattern part may be acceptable).

The method of FIG. 6 allows constructing in an interactive way both the task graph and a state tree. Declaring a task adds a node to the task graph, declaring a parent-child relationship adds an edge to said graph; running a simulation generates a node of the state tree and an edge linking the node representing the initial state of the simulation and the newly-generated node.

An hybrid non interactive—interactive approach may also be implemented—e.g. an initial task graph may be defined non-interactively, then it may be modified interactively by adding new tasks while running the assembly simulation.

The invention will be better understood with the help of three examples, illustrated by FIGS. 8A-8D, 9A-9G, 10-10G.

The first example (FIGS. 8A-8D) concerns the assembly of the pattern parts P1-P12 illustrated on FIG. 1A around a manikin MK to form a garment GR. Like in the prior art, the assembly is performed in a single task "A", which is applied to the empty state 0. The task declaration is as follows:

"Task A":
    Add pattern parts 1 to 14 around the manikin
        set them active
        use detailed meshes (for accurate simulation)
    Declare all 34 garment seams by selecting seam line pairs.
        Set them active (default)
    Set simulation parameters
        Activate gravity
        Set seam assembly synchronization
        Set the duration to accomplish this task (e.g. 2 s)

Figure 8A:
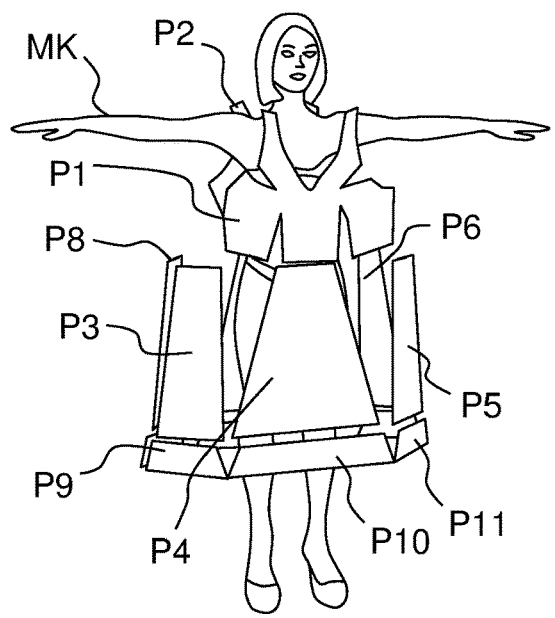
FIGS. 8A-8D, a first embodiment of a method according to the invention.
Figure 8B:
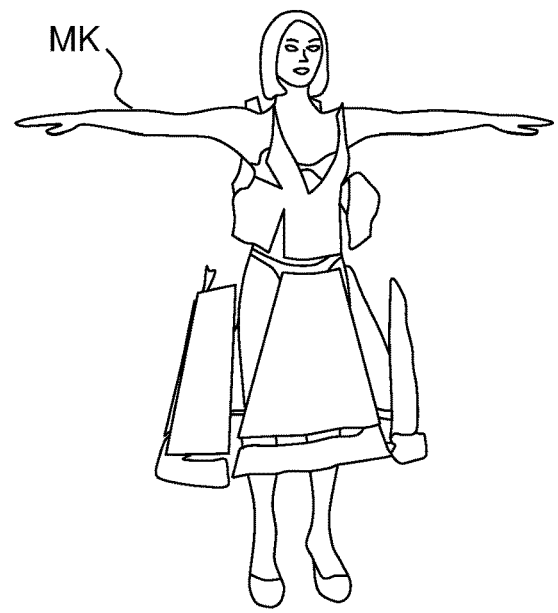
Figure 8C:
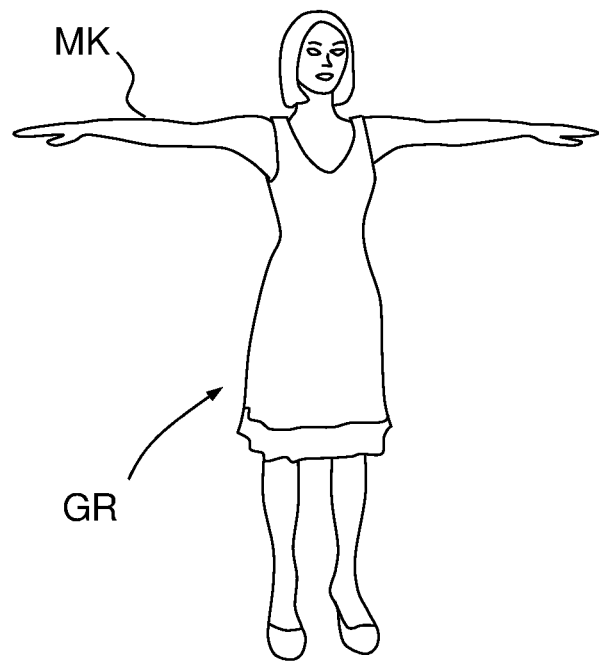
Figure 8D:

Executing the task generates State 1, in which the whole garment is assembled. FIG. 8A shows the pattern parts arranged around the manikin MK, FIG. 8B shows an intermediate position of the pattern parts during the assembly phase, FIG. 8C shows the assembled garment GR, draped on the manikin and FIG. 8D represents the state tree.

Performing the assembly in a single step is not the best way to proceed, as it makes the final result highly sensitive to the pattern part positioning and the simulation conditions. In particular, the free fall of pattern parts due to gravity may forbid correct straps assembly. Moreover, as there are no intermediate states, any change to a pattern part would require a complete re-run of the simulation.

The second example, illustrated by FIGS. 9A to 9G, concerns an embodiment of the invention wherein the assembly and simulation of the garment is decomposed into four tasks executed in sequence.

The first task, A, consists in assembling the bodice BD of the garment. Its execution is illustrated on FIG. 8A (showing pattern parts P1 and P2 disposed around the manikin) and 8B (showing the assembled bodice). Its declaration is as follows:

"Task A": Bodice assembly
    Add pattern parts 1 and 2
        Set them active
        Use coarse meshes
    Add seams to assemble during this task (4 between front and back bodice parts+4 for notches on front part+2 for notches on back part)
    Set simulation parameters
        De-activate the gravity
        Set seam assembly synchronization
        Set the duration to accomplish this task (0.5 s)

It will be noticed that the gravity is de-activated to avoid the risk that the pattern parts fall before the straps are assembled, and that coarse meshes are used—which allows a sufficiently accurate simulation of the assembly step while reducing the computation time.

The second task, B, consists in assembling the main skirt SK of the garment. Its execution is illustrated on FIGS. 8C (showing pattern parts P3 to P8 disposed around the manikin) and 8D (showing the partly assembled dress, including the bodice and the skirt). Its declaration is as follows:

"Task B": Main skirt assembly
    Freeze pattern parts 1 and 2 in their current state to optimize the simulation cost
    Add main skirt pattern parts (3 to 8)
        Set them active
        Use coarse meshes
    Add 12 seams connecting the newly added parts together and to the previously existing ones
    Set simulation parameters
        De-activate the gravity
        Set seam assembly synchronization
        Set the duration to accomplish this task (1 s)

Settings are the same as for the first task (except the assembly time, which is longer).

The third task, C, consists in assembling the skirt extension. Its execution is illustrated on FIG. 8E (showing pattern parts P9 to P14 disposed around the manikin) and 8F (showing the assembled garment, which is not correctly draped due to the absence of gravity and to the coarseness of the meshes). Its declaration is as follows:

"Task C": Skirt extension assembly
    Freeze pattern parts 3 to 8 (parts 1 and 2 also remain frozen since reactivation is not required)
    Add skirt extension pattern parts (9 to 14)
        Set them active
        Use coarse meshes
    Add 12 seams connecting the newly added parts together and to the previously existing ones
    Set simulation parameters
        De-activate the gravity
        Set seam assembly synchronization
        Set the duration to accomplish this task (0.5 s)

Settings are the same as for the first task.

The fourth task, D, consists in accurately simulating the draping of the assembled garment, activating gravity and using finer meshes. Its declaration is as follows:

"Task D": Final draping with accurate simulation
    Re-activate all pattern parts
    Switch from coarse to thin meshes
    [No new seam declaration]
    Run simulation.

Figure 9A:
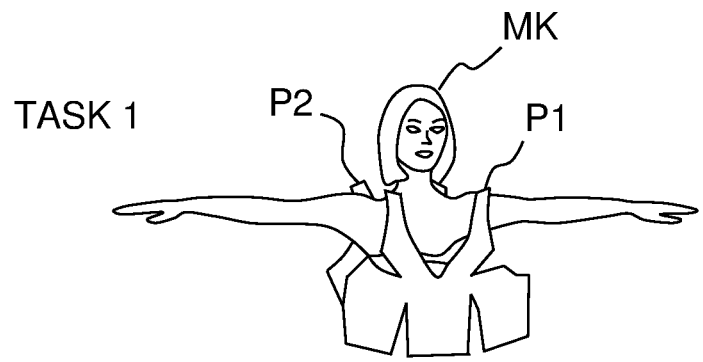
FIGS. 9A-9H, a second embodiment of a method according to the invention.
Figure 9B:
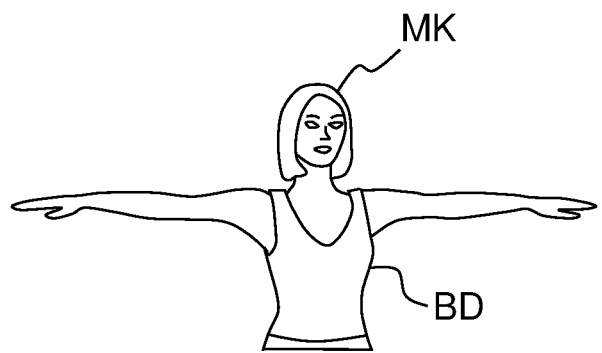
Figure 9C:
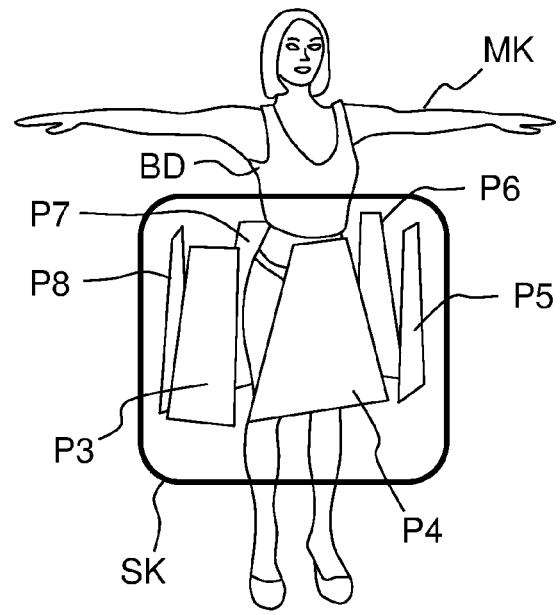
Figure 9D:
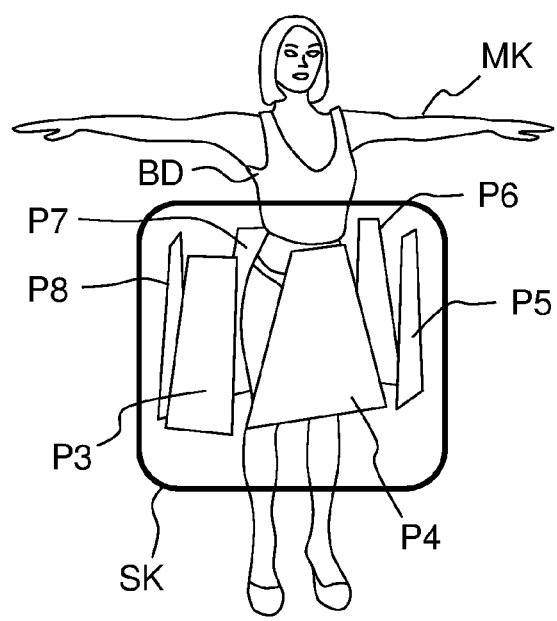
Figure 9E:
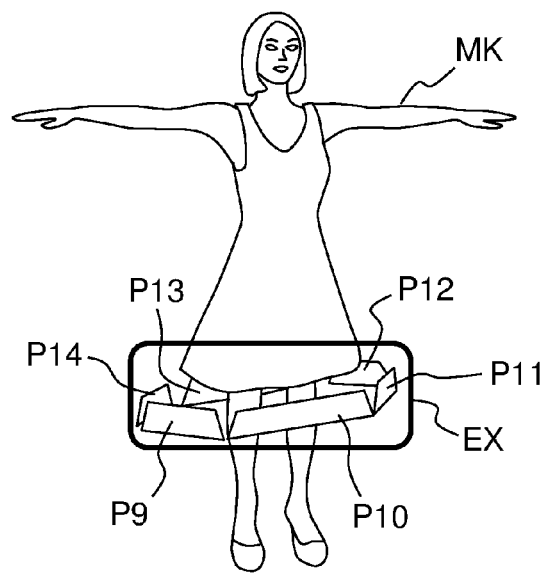
Figure 9F:
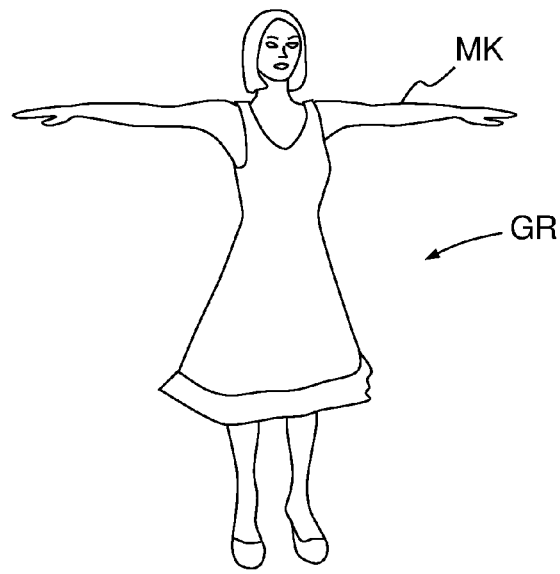
Figure 9G:
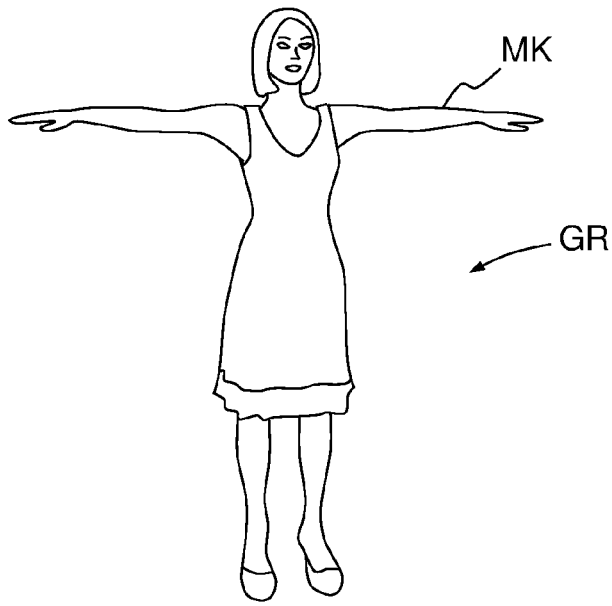
Figure 9H:
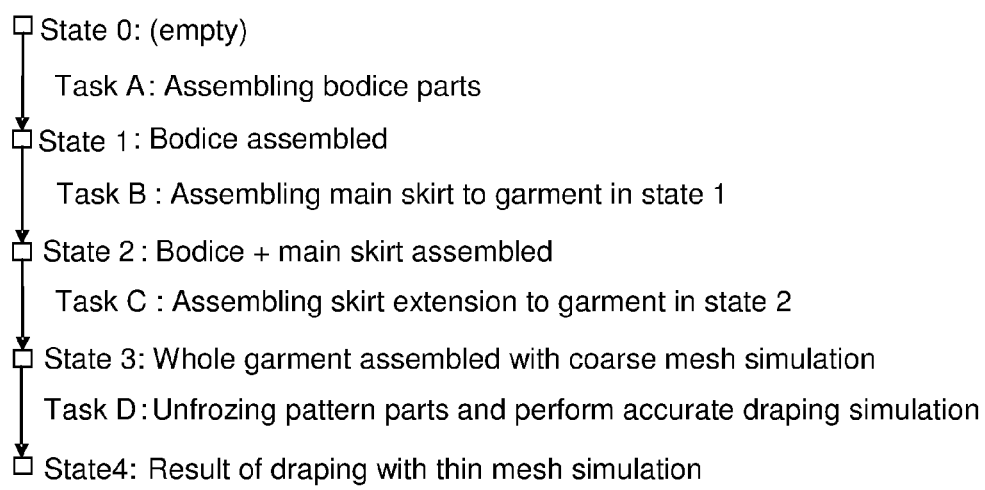

FIG. 9H shows the state tree, which comprises a single branch (i.e. is a list).

The third example, illustrated by FIGS. 10A to 10H, concerns an embodiment of the invention wherein the state tree is used to simplify the simulation of different versions of a garment.

Figure 10A:
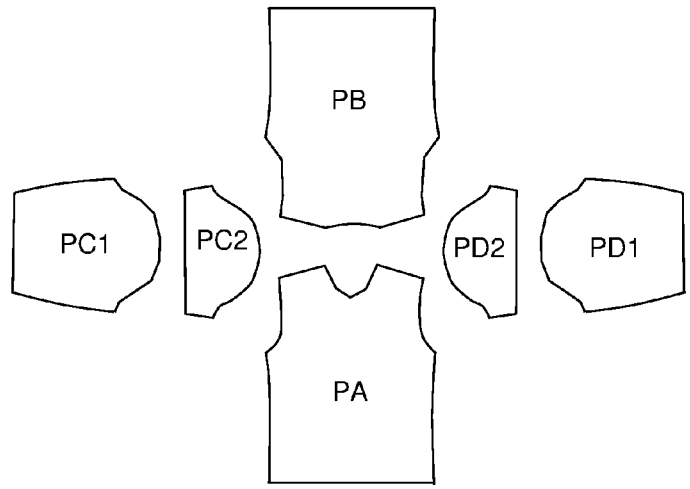
FIGS. 10A-10H, a third embodiment of a method according to the invention.

FIG. 10A shows the pattern parts of a T-shirt G2 which may have short or long sleeves (PA: front panel; PB: back panel; PC1: right sleeve, long version; PC2: right sleeve, short version; PD1: left sleeve, long version; PD2: left sleeve, short version). The assembly comprises three tasks.

Figure 10B:
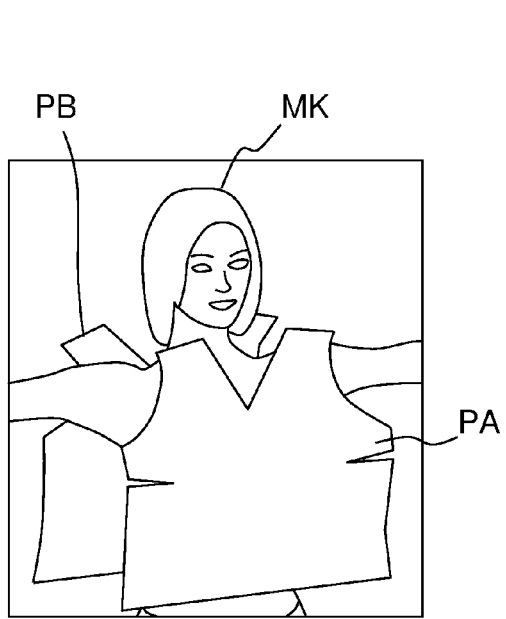
Figure 10C:

Task A, applied to the empty initial state 0, consists in assembling the common parts. It is illustrated by FIGS. 10B (pre-positioned pattern parts) and 10C (assembled pattern parts). Its definition is as follows:

"Task A": Assemble common part
    Add pattern parts PA and PB
        Set them active
        Use coarse meshes
    Add 4 seams connecting them together (2 on shoulders and 2 on the sides) and set them active
    Set simulation parameters
        De-activate the gravity
        Set seam assembly synchronization
        Set the duration to accomplish this task (0.5 s)

Figure 10D:
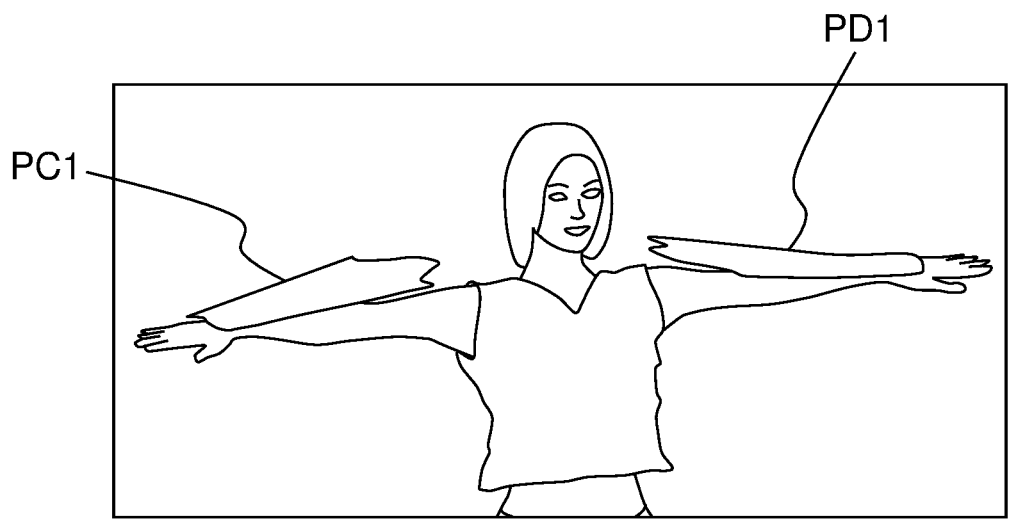
Figure 10E:
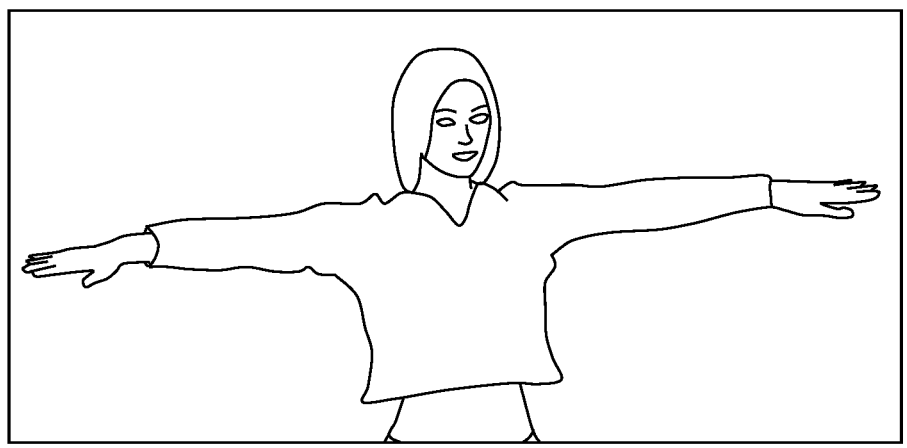

Task B1, applied to state 1 obtained by executing task A, consists in assembling the long sleeves. It is illustrated by FIGS. 10D (pre-positioned pattern parts) and 10E (assembled pattern parts). Its definition is as follows:

"Task B1": Assemble long sleeves
　Add pattern parts PC1 and PD1
　　Set them active
　　Use coarse meshes
　　Add 3 seams for each sleeve connecting them to front and back pattern parts and to close shape the sleeve itself, and set them actives
　Set simulation parameters
　　Activate the gravity
　　Set seam assembly synchronization
　　Set the duration to accomplish this task (0.5 s)

It is interesting to note that gravity is activated, as it is required for assembling the sleeves around the arms of the manikin.

Figure 10F:
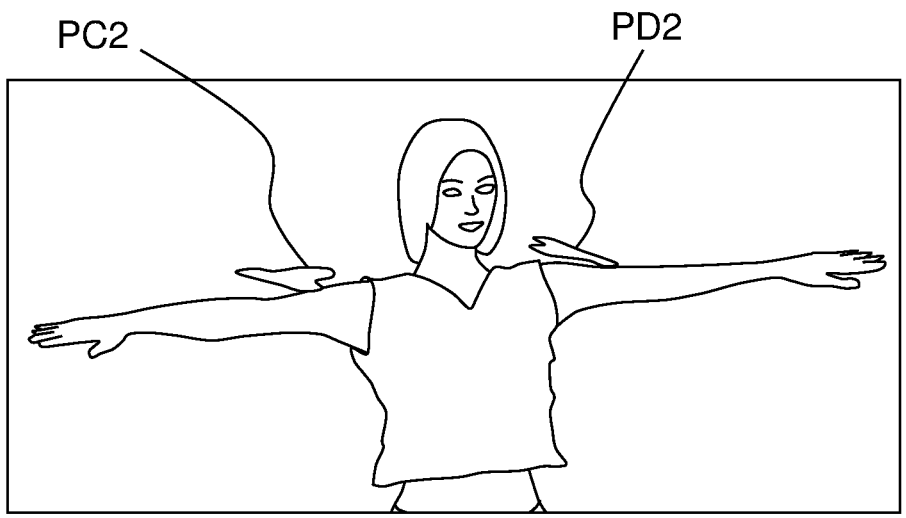
Figure 10G:
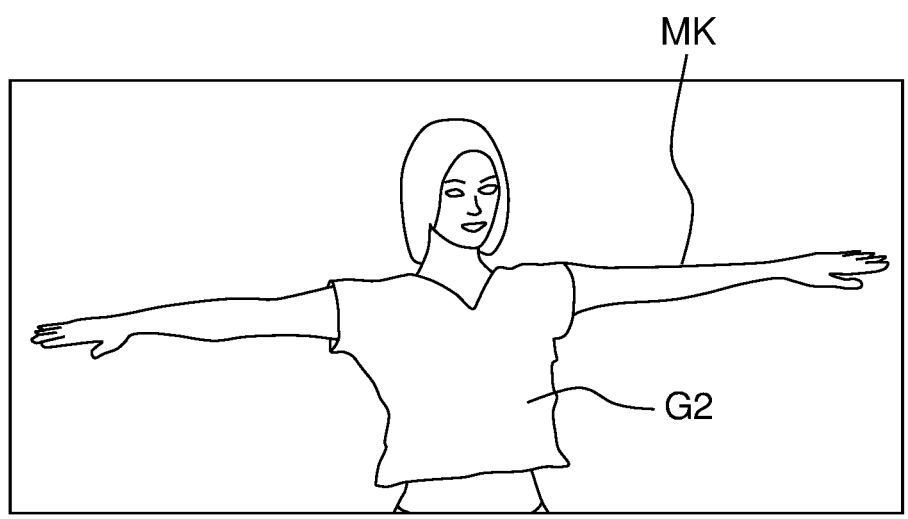

Task B2, also applied to state 1 obtained by executing task A, consists in assembling the short sleeves. It is illustrated by FIGS. 10F (pre-positioned pattern parts) and 10G (assembled pattern parts). Its definition is as follows:

"Task B2": Assemble short sleeves
　Add pattern parts PC2 and PD2
　　Set them active
　　Use coarse meshes
　　Add 3 seams for each sleeve connecting them to front and back pattern parts and to close shape the sleeve itself, and set them actives
　Set simulation parameters
　　Activate the gravity
　　Set seam assembly synchronization
　　Set the duration to accomplish this task (0.5 s)

Figure 10H:
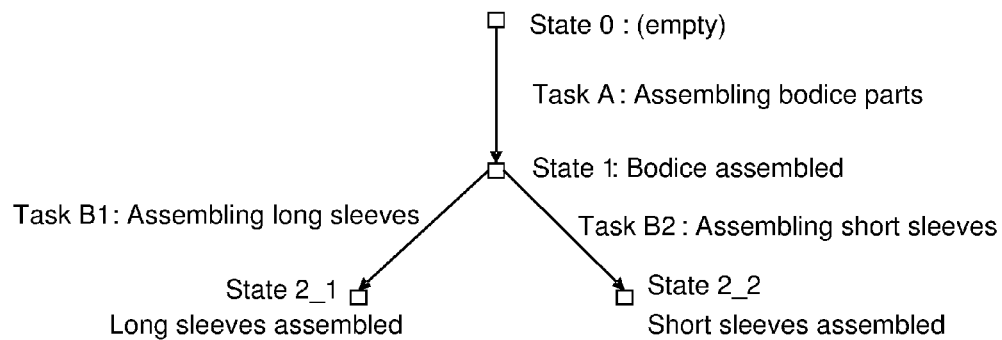

The resulting state tree, illustrated on FIG. 10H, has two branches, and therefore two different leaf nodes—State 2_1 and State 2_2, corresponding to two different versions of the garment. Further tasks—and therefore nodes of the tree—could be added, for instance for computing an accurate draping in the presence of gravity, as for the second example. As discussed above, an advantageous feature of the invention is that both versions of the garment may be simulated starting from state 1, i.e. without having to re-execute task A.

The inventive method can be performed by a suitably-programmed general-purpose computer or computer system, possibly including a computer network, storing a suitable program in non-volatile form on a computer-readable medium such as a hard disk, a solid state disk or a CD-ROM and executing said program using its microprocessor(s) and memory.

Figure 11:
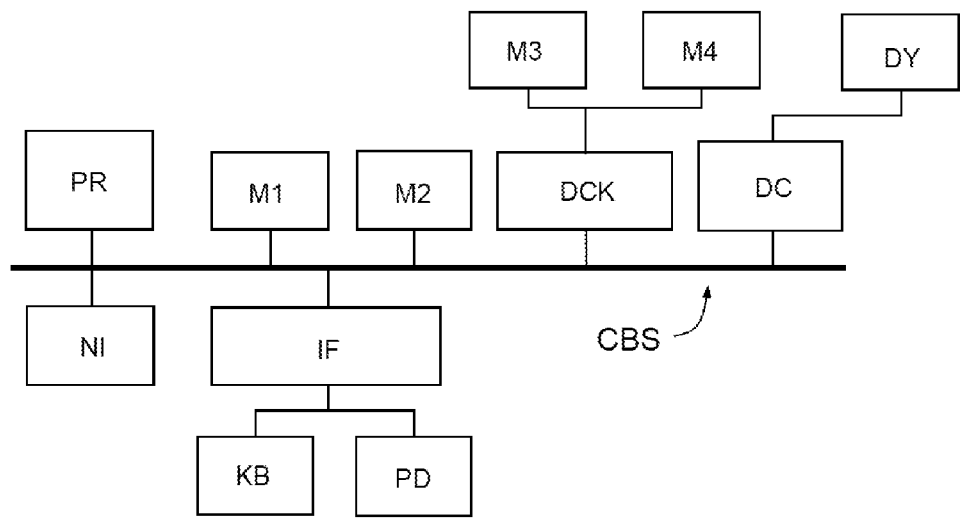
FIGS. 11 and 12 are block diagrams of respective computer systems suitable for carrying out a method according to an embodiment of the invention.

A computer—more precisely a computer aided design station—suitable for carrying out a method according to an exemplary embodiment of the present invention is described with reference to FIG. 11. In FIG. 11, the computer includes a Central Processing Unit (CPU) PR which performs the processes described above. The process can be stored as an executable program, i.e. a set of computer-readable instructions in memory, such as RAM M1 or ROM M2, or on hard disk drive (HDD) M3, DVD/CD drive M4, or can be stored remotely. A manikin database, and a pattern database—i.e. organized sets of digital models of manikin and garment pattern parts in a form suitable to be processed by the executable program according to the inventive method—may also be stored on one or more of memory devices M1 to M4, or remotely.

The claimed invention is not limited by the form of the computer-readable media on which the computer-readable instructions and/or the manikin and garment databases of the inventive process are stored. For example, the instructions and databases can be stored on CDs, DVDs, in FLASH memory, RAM, ROM, PROM, EPROM, EEPROM, hard disk or any other information processing device with which the computer aided design station communicates, such as a server or computer. The program and the database can be stored on a same memory device or on different memory devices.

Further, a computer program suitable for carrying out the inventive method can be provided as a utility application, background daemon, or component of an operating system, or combination thereof, executing in conjunction with CPU PR and an operating system such as Microsoft VISTA, Microsoft Windows 8, UNIX, Solaris, LINUX, Apple MAC-OS and other systems known to those skilled in the art.

CPU PR can be a Xenon processor from Intel of America or an Opteron processor from AMD of America, or can be other processor types, such as a Freescale ColdFire, IMX, or ARM processor from Freescale Corporation of America. Alternatively, the CPU can be a processor such as a Core2 Duo from Intel Corporation of America, or can be implemented on an FPGA, ASIC, PLD or using discrete logic circuits, as one of ordinary skill in the art would recognize. Further, the CPU can be implemented as multiple processors cooperatively working to perform the computer-readable instructions of the inventive processes described above.

The computer aided design station in FIG. 11 also includes a network interface NI, such as an Intel Ethernet PRO network interface card from Intel Corporation of America, for interfacing with a network, such as a local area network (LAN), wide area network (WAN), the Internet and the like. The computer aided design station further includes a display controller DC, such as a NVIDIA GeForce GTX graphics adaptor from NVIDIA Corporation of America for interfacing with display DY, such as a Hewlett Packard HPL2445w LCD monitor. A general purpose I/O interface IF interfaces with a keyboard KB and pointing device PD, such as a roller ball, mouse, touchpad and the like. The display, the keyboard and the pointing device, together with the display controller and the I/O interfaces, form a graphical user interface.

Disk controller DKC connects HDD M3 and DVD/CD M4 with communication bus CBS, which can be an ISA, EISA, VESA, PCI, or similar, for interconnecting all of the components of the computer aided design station.

A description of the general features and functionality of the display, keyboard, pointing device, as well as the display controller, disk controller, network interface and I/O interface is omitted herein for brevity as these features are known.

Figure 12:
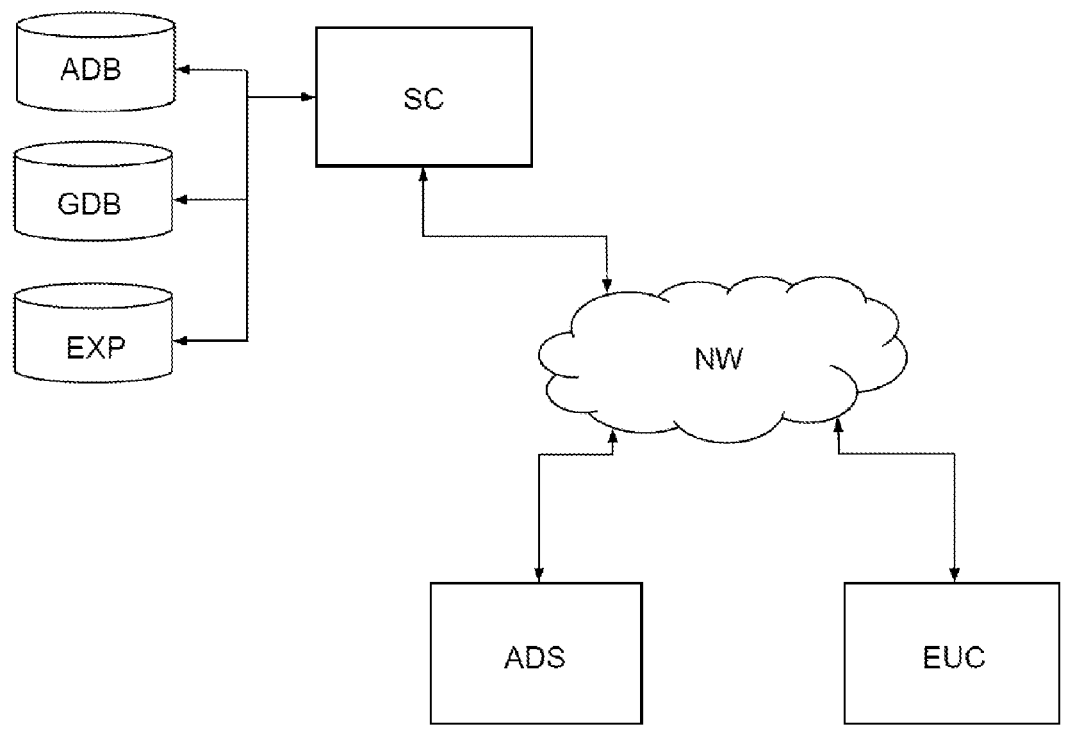

FIG. 12 is a block diagram of a computer system suitable for carrying out a method according to a different exemplary embodiment of the present invention.

In FIG. 12, the executable program EXP, the manikin database ADB and the garment pattern database GDB are stored on memory devices connected to a server SC. The memory devices and the overall architecture of the server may be the same as discussed above with reference to FIG. 11, except that display controller, display, keyboard and/or pointing device may be missing in the server.

The server SC is then connected to an administrator system ADS and end user computer EUC via a network NW.

The overall architectures of the administrator system and of the end user computer may be the same as discussed above with reference to FIG. 11, except that the memory devices of the administrator system and the end user computer do not store the executable program EXP, the manikin database ADB and the garment pattern database GDB. However, the end user computer does store a client program designed for cooperating with the executable program of the server, as it will be discussed below.

As can be appreciated, the network NW can be a public network, such as the Internet, or a private network such as an LAN or WAN network, or any combination thereof and can also include PSTN or ISDN sub-networks. The network NW can also be wired, such as an Ethernet network, or can be wireless such as a cellular network including EDGE, 3G and 4G wireless cellular systems. The wireless network can also be Wi-Fi, Bluetooth, or any other wireless form of communication that is known. Thus, the network NW is merely exemplary and in no way limits the scope of the present advancements.

The client program stored in a memory device of the end user computer and executed by a CPU of the latter accesses the manikin and garment pattern databases on the server via the network NW. This allows an end user to select a manikin and a set of pattern parts forming a garment adapted to said manikin, to pre-position them in a 3D virtual space, and to enter seam and task definitions. The server performs the processing as described above with reference to FIGS. 2A to 10H, taking into account inputs from the user. It then transmits the manikin dressed with the assembled garment, the state tree and, optionally, the task graph, again using the network NW.

Although only one administrator system ADS and one end user system EUX are shown, the system can support any number of administrator systems and/or end user systems without limitation. Similarly, multiple servers, manikin databases and garment pattern databases can also be implemented in the system without departing from the scope of the present invention.

Any processes, descriptions or blocks in flowcharts described herein should be understood as representing modules, segments, or portions of code which include one or more executable instructions for implementing specific logical functions or steps in the process, and alternate implementations are included within the scope of the exemplary embodiment of the present invention.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

REFERENCES

[Pro97] X. Provot. Animation réaliste de vêtements. PhD Thesis. Université René Descartes-Paris V, 1997.

[Fon05] Marzia Fontana, Caterina Rizzi, Umberto Cugini. 3D virtual apparel design for industrial applications. Computer-Aided Design 37 (2005), pp 609-622.

[Kec05] Michael Keckeisen. Physical Cloth Simulation and Applications for the Visualization, Virtual Try-On, and Interactive Design of Garments. PhD Thesis, Tübingen University, 2005.

[Fuh05]A. Fuhrmann, C. Groβ, A. Weber. Ontologies for Virtual Garments, Workshop Towards Semantic Virtual Environments (SVE 2005), 2005

[CLO3D] CLO 3D/Marvelous Designer Manual. 2013.

What is claimed is:

1. A computer-implemented method for designing a virtual garment (GR) or upholstery in a three-dimensional scene comprising the steps of:
   a) providing a three-dimensional manikin (MK) in the three-dimensional scene, a set of pattern parts (P1-P14) of said virtual garment or upholstery and a set of seam specification, a seam (S1-S7) including a set of distance constraints between pairs of points of two pattern part edges to be stitched together;
   b) receiving as inputs from a user a plurality of declarations of assembly tasks (A, B, C, D1, D2, E1, E21, E22, F2) for assembling the garment or upholstery;
   c) receiving as an input from the user at least a declaration of a partial ordering relationship between two or more of said assembly tasks;
   d) executing said assembly tasks according to said partial ordering relationship, each assembly task changing a state (0-3, 41, 42, 51, 521, 522, 621, 622) of the garment or upholstery under assembly; and
   e) while executing the assembly tasks, generating and storing in a memory device a tree data structure comprising nodes linked by directed arcs, each node storing information defining a state of the garment or upholstery and each arc being associated to an assembly task, the assembly task of an arc connecting a first node to a second node changing the state associated to the first node to the state associated to the second node.

2. The method of claim 1, wherein step d) comprises performing a physics-based simulation of the assembly of the garment or upholstery.

3. The method of claim 2, wherein at least one assembly task comprises at least:
   i) adding a pattern part and positioning it around the manikin, or removing a pattern part already positioned around the manikin;
   ii) activating or freezing a pattern part, wherein an activated pattern part is fully simulated while, during simulation, a frozen pattern part remains immobile but is suitable to interact with other parts;
   iii) adding or removing a seam specification;
   iv) activating or freezing a seam wherein, during simulation, the distance constraints of a frozen seam remain unchanged while those of an activated seam are progressively decreased until a threshold is reached and the points are merged;
   v) changing a level of simulation detail of a pattern part; or
   vi) introducing or removing geometrical constraints on a pattern part.

4. The method of claim 1, wherein at least one assembly task comprises setting at least one simulation parameter chosen among:
   i) gravity strength;
   ii) assembly speed;
   iii) threshold for merging of two points of a seam;
   iv) type of synchronization of the decrease of the distance constraints of an activated seam.

5. The method of claim 1, wherein step b) further comprises receiving from a user at least one instruction for modifying a design of a pattern part, or a pattern part positioning around the manikin.

6. The method of claim 1, wherein steps b) and c) are carried out interactively.

7. The method of any claim 1, further comprising a step of performing a consistency check wherein pattern parts or seams not involved in any assembly task or having a status incompatible with an assembly task are identified.

8. The method of claim 1, further comprising a step of cleaning up the assembly tasks, wherein, when a pattern part is removed from the garment, the pattern part and any seam referencing it are removed from all the assembly tasks.

9. The method of claim 1 further comprising, a step of generating and storing in a memory device a direct acyclic oriented graph data structure comprising nodes linked by directed arcs, each node storing the definition of an assembly task of the list and arcs representing an ordering of said assembly tasks.

10. The method of claim 9 further comprising, a step of selecting a tree within said direct acyclic oriented graph data structure and carrying out the assembly tasks associated with the nodes of the tree in an order defined by its arcs.

11. The method of claim 10 further comprising, a step of designing a variation of said virtual garment (GR) or upholstery starting from a state defined by information stored in a node of said tree data structure.

12. The method of claim 1, further comprising:
cleaning up the assembly tasks, wherein, when a pattern part is removed from an assembly task, the pattern part and all seams referencing it are removed from all the following assembly tasks.

13. A computer program product (EXP), stored on a non-transitory computer-readable data-storage medium (M1-M4), comprising computer-executable instructions to cause a computer system to design a virtual garment or upholstery in a three-dimensional scene by:
a) providing a three-dimensional manikin (MK) in the three-dimensional scene, a set of pattern parts (P1-P14) of said virtual garment or upholstery and a set of seam specification, a seam (S1-S7) including a set of distance constraints between pairs of points of two pattern part edges to be stitched together;
b) receiving as inputs from a user a plurality of declarations of assembly tasks (A, B, C, D1, D2, E1, E21, E22, F2) for assembling the garment or upholstery;
c) receiving as an input from the user at least a declaration of a partial ordering relationship between two or more of said assembly tasks;
d) executing said assembly tasks according to said partial ordering relationship, each assembly task changing a state (0-3, 41, 42, 51, 521, 522, 621, 622) of the garment or upholstery under assembly; and
e) while executing the assembly tasks, generating and storing in a memory device a tree data structure comprising nodes linked by directed arcs, each node storing information defining a state of the garment or upholstery and each arc being associated to an assembly task, the assembly task of an arc connecting a first node to a second node changing the state associated to the first node to the state associated to the second node.

14. A non-transitory computer-readable data-storage medium comprising:
a memory storage area containing (M1-M4) computer-executable instructions (EXP) to cause a computer system to design a virtual garment or upholstery in a three-dimensional scene by:
a) providing a three-dimensional manikin (MK) in the three-dimensional scene, a set of pattern parts (P1-P14) of said virtual garment or upholstery and a set of seam specification, a seam (S1-S7) including a set of distance constraints between pairs of points of two pattern part edges to be stitched together;
b) receiving as inputs from a user a plurality of declarations of assembly tasks (A, B, C, D1, D2, E1, E21, E22, F2) for assembling the garment or upholstery;
c) receiving as an input from the user at least a declaration of a partial ordering relationship between two or more of said assembly tasks;
d) executing said assembly tasks according to said partial ordering relationship, each assembly task changing a state (0-3, 41, 42, 51, 521, 522, 621, 622) of the garment or upholstery under assembly; and
e) while executing the assembly tasks, generating and storing in a memory device a tree data structure comprising nodes linked by directed arcs, each node storing information defining a state of the garment or upholstery and each arc being associated to an assembly task, the assembly task of an arc connecting a first node to a second node changing the state associated to the first node to the state associated to the second node.

15. A computer aided design system comprising:
a processor (PR) coupled to a non-transitory memory (M1-M4) and a graphical user interface (IF, KB, PD, DC, DY),
the non-transitory memory storing computer-executable instructions that cause the computer aided design system to design a virtual garment or upholstery in a three-dimensional scene by:
a) providing a three-dimensional manikin (MK) in the three-dimensional scene, a set of pattern parts (P1-P14) of said virtual garment or upholstery and a set of seam specification, a seam (S1-S7) including a set of distance constraints between pairs of points of two pattern part edges to be stitched together;
b) receiving as inputs from a user a plurality of declarations of assembly tasks (A, B, C, D1, D2, E1, E21, E22, F2) for assembling the garment or upholstery;
c) receiving as an input from the user at least a declaration of a partial ordering relationship between two or more of said assembly tasks;
d) executing said assembly tasks according to said partial ordering relationship, each assembly task changing a state (0-3, 41, 42, 51, 521, 522, 621, 622) of the garment or upholstery under assembly; and
e) while executing the assembly tasks, generating and storing in a memory device a tree data structure comprising nodes linked by directed arcs, each node storing information defining a state of the garment or upholstery and each arc being associated to an assembly task, the assembly task of an arc connecting a first node to a second node changing the state associated to the first node to the state associated to the second node.

16. A method of manufacturing a garment or upholstery comprising:
i) a step of designing said garment or upholstery by:
a) providing a three-dimensional manikin (MK) in a three-dimensional scene, a set of pattern parts (P1-P14) of said virtual garment or upholstery and a set of seam specification, a seam (S1-S7) including a set of distance constraints between pairs of points of two pattern part edges to be stitched together;
b) receiving as inputs from a user a plurality of declarations of assembly tasks (A, B, C, D1, D2, E1, E21, E22, F2) for assembling the garment or upholstery;
c) receiving as an input from the user at least a declaration of a partial ordering relationship between two or more of said assembly tasks;
d) executing said assembly tasks according to said partial ordering relationship, each assembly task changing a state (0-3, 41, 42, 51, 521, 522, 621, 622) of the garment or upholstery under assembly; and e) while executing the assembly tasks, generating and storing in a memory device a tree data structure comprising nodes linked by directed arcs, each node storing information defining a state of the garment or upholstery and each arc being associated to an assembly task, the assembly task of an arc connecting a first node to a second node changing the state associated to the first node to the state associated to the second node; and ii) a step of physically manufacturing said garment or upholstery by carrying out physical assembly tasks corresponding to assembly tasks associated to a set of nodes of a tree data structure generated during the design step, carried out in an order defined by the arcs of said tree data structure.

* * * * *